April 2, 1946.  W. C. ANTHONY  2,397,519
WELDER HANDLE
Filed Feb. 26, 1944  2 Sheets-Sheet 1
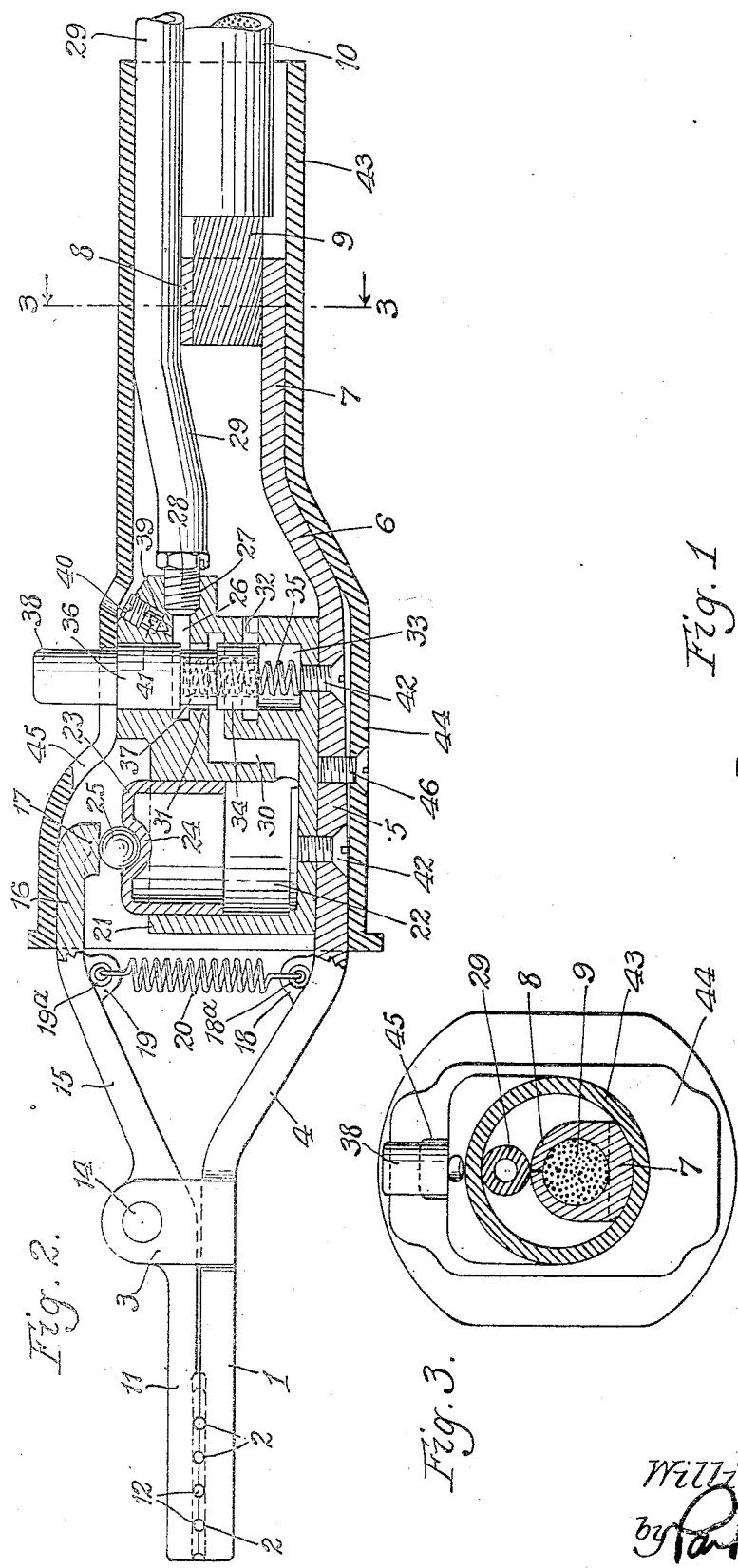
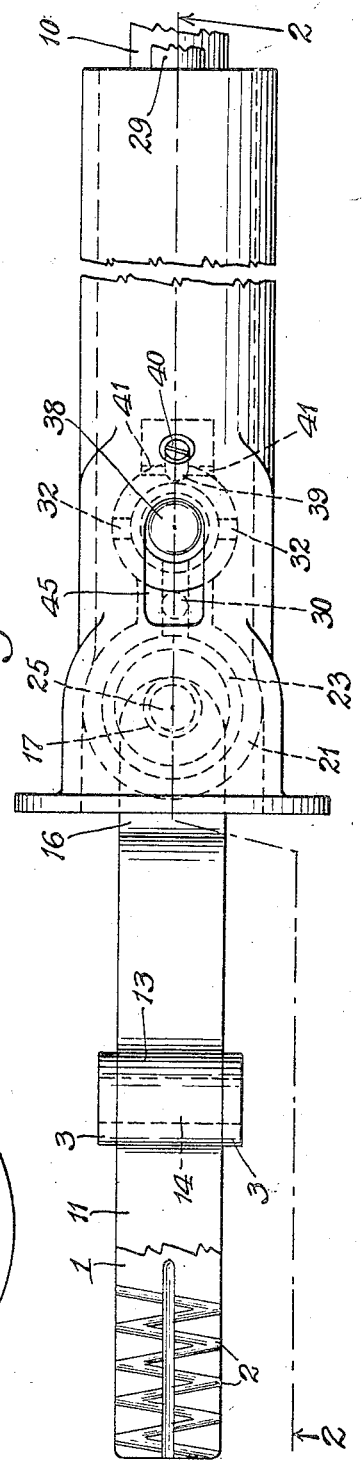
Inventor
William C. Anthony
by Parker Carter
Attorneys

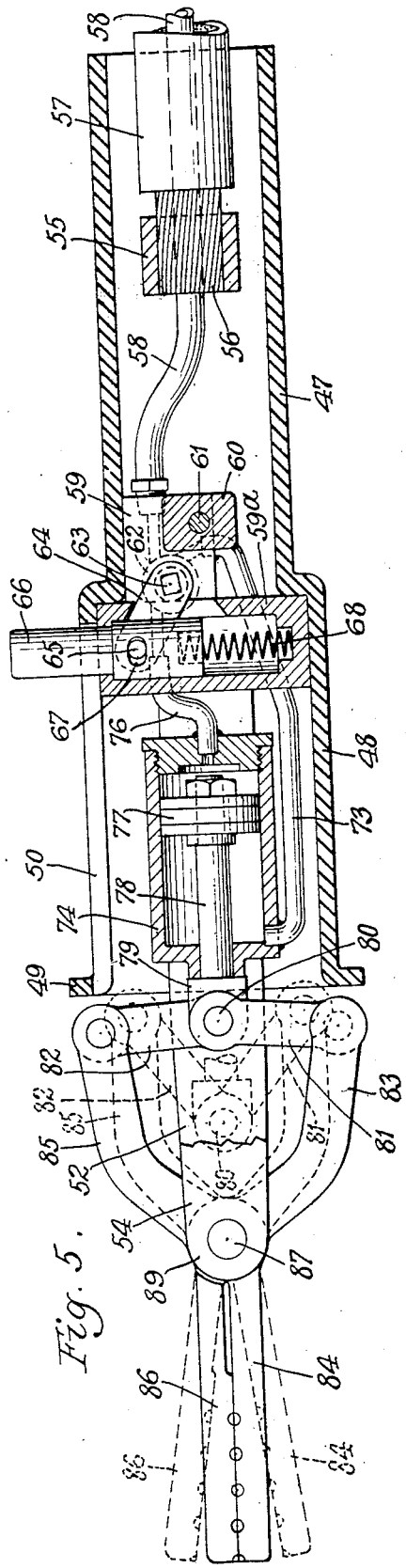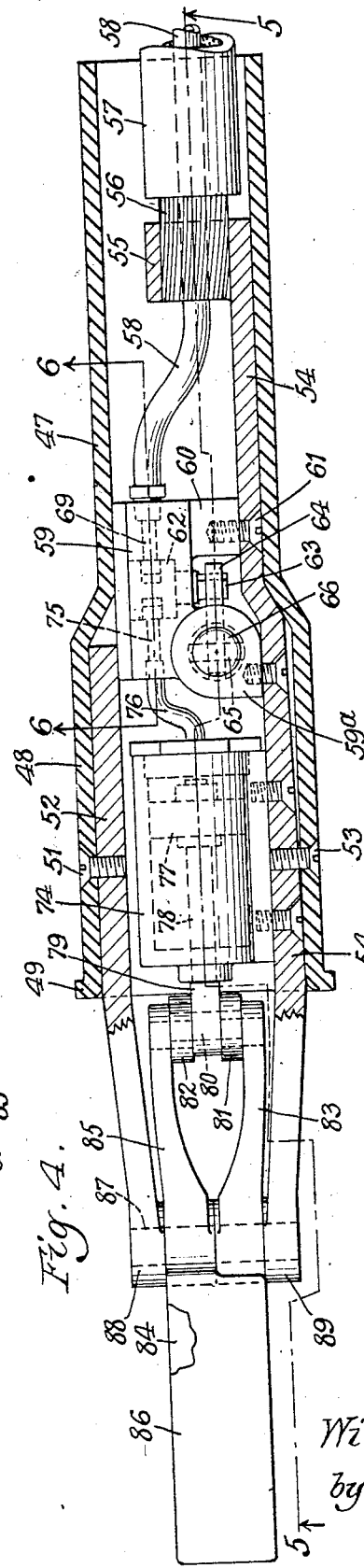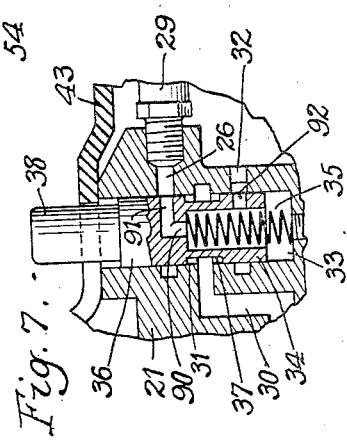

Patented Apr. 2, 1946

2,397,519

UNITED STATES PATENT OFFICE 2,397,519

WELDER HANDLE

William C. Anthony, Streator, Ill.

Application February 26, 1944, Serial No. 524,023

12 Claims. (Cl. 219—8)

This invention relates to a tool handle and primarily to a handle for holding welding rods or other members used in welding during the welding operation. It has for one object to provide means for moving the jaws of a welding handle by power in order to reduce the amount of work which the operator must do and, therefore, in order to reduce fatigue.

Another object is to provide means for cooling a welding handle during welding operation. It is recognized that under some conditions handles for welding rods used in electrical welding become extremely hot, and frequently they become so hot as to injure or greatly inconvenience the operator. An important object of this invention is, therefore, to provide means for cooling the handle during welding, and this object may be attained by the same general means which is used to provide power operation for the welding jaws.

A still further object is to provide power operation for the jaws and cooling for the handle and to provide a single source from which both means are operated or actuated. Although in this embodiment of the invention both results are accomplished by the use of air, they may also be accomplished by the use of other fluids and the invention is not limited to air operation.

Other objects will appear from time to time throughout the specification and claims.

The invention is illustrated more or less diagrammatically in the accompanying drawings, wherein:

Figure 1 is a plan view of one form of the device;

Figure 2 is a longitudinal cross section taken at line 2—2 of Figure 1 with parts in elevation;

Figure 3 is a transverse section taken at line 3—3 of Figure 2;

Figure 4 is a section of a modified form;

Figure 5 is a section at line 5—5 of Figure 4;

Figure 6 is a section at line 6—6 of Figure 4; and

Figure 7 is a modified form of the valve construction of Figure 2.

Like parts are indicated by like characters throughout the specification and the drawings.

In the particular form here shown, the welder handle comprises a pair of jaws arranged to operate together and connected for relative movement. As shown the one jaw comprises a relatively flat member 1 which may have on its upper surface one or more depressions, both shaped to engage a welding rod. The member 1 is provided with upwardly directed ears 3. It is also bent, as shown in Figure 2, downwardly and rearwardly to form a portion 4. A relatively flat portion 5 is arranged to receive a mechanism which will be described below. It may be bent upwardly and rearwardly, as at 6, and may be provided with a flat portion 7 which has an integral, rounded portion 8. This portion may be made of one piece or have two pieces bent toward each other, the purpose of the member being to engage tightly the conductor 9 through which electrical current is supplied to the welder and ordinarily, of course, an insulating cover 10 is provided about the conductor portion 9.

The second jaw comprises a relatively flat member 11 of the same or approximately the same size and shape as the portion 1 of the first jaw. It is also provided with depressions or grooves 12, corresponding, as a rule, in size and shape to the depressions 2 in the member 1. It may be provided with an enlarged or thickened portion 13 which is positioned between the ears 3. A bearing pin 14 passes through the ears 3 and through the enlarged portion 13 and furnishes a bearing for the jaws to permit their relative swinging. Extending upwardly and rearwardly from the portion 11 is a portion 15 which terminates in a relatively extended portion 16. The portion 16 may have a downwardly depending end 17, if desired.

Positioned on each of the portions 4 and 15 are perforated members 18 and 19, respectively, and these members are engaged by a spring 20 which acts, when free to do so, to draw them toward each other. Thus, when free to do so, the spring 20 will tend to open the jaws 1 and 11.

Insulating means 18a and 19a may, if desired, be inserted in the openings in the perforated members 18 and 19, respectively, in order to insulate the spring 20. If this were not done, current might, under some conditions, flow through the spring 20 and heat and destroy the temper of the spring.

One suitable form of a mechanism which may be used to accomplish movement of the jaws by power rather than by the strength of the hand or the fingers of the operator is shown in the accompanying drawings. As they are shown it comprises generally a piston and cylinder assembly, a passage or pipe, through which pressure fluid is conducted to the assembly and a valve for controlling movement of the pressure fluid.

As shown a housing member 21 is formed to provide a cylinder 22 within which a piston 23 may reciprocate. If desired, the head of the piston is depressed as at 24 to receive a ball bearing 25 which is contacted by the downwardly turned point 17 of the member 16. This construction furnishes an anti-friction bearing between the cylinder and the member which it operates. Other forms of anti-friction bearings or other contacting means might be substituted at that point without departing from the spirit of the invention.

Formed preferably integrally in the housing member 22 is an inlet passage 26 which may at its outer end be provided with a threaded enlarged opening 27. Received in this opening is a threaded connector 28 which is attached to a tube or pipe 29 through which pressure fluid is conducted to the housing. The passage 26 communicates by means of a passage 30 with the cylinder 22, and it is provided with a restriction 31.

The housing 21 is also provided with an exhaust passage 32 and with a seating cavity 33 within which a valve member 34 is adapted to be moved. A spring 35 normally holds the valve in the upward position, as shown in Figure 2. The valve portion 34 is preferably made integral with a second valve portion 36, and the two are joined together by a portion 37 of reduced width. A contact portion 38, which is preferably integral with the valve portions 34 and 36, extends outwardly beyond the handle and is available for use.

If desired, for cooling or other purposes, a bleeder opening 39 may be provided in the housing 21 and in communication with the passage 26. A control member 40 may be mounted in the bleeder passage 39 and is adjustably positioned therein, so that it may be moved in and out or otherwise moved to cut off the bleeder effect or to permit air to escape in varying degrees. Escape ports 41 are formed in the opening 39.

While the various parts may be assembled in many ways, it is ordinarily convenient to fasten the lower jaw to the housing 22 by screws 42 which pass through the portion 5. A hollow handle member 43, 44 surrounds the handle assembly. A slot 45 is formed in the handle to clear the member 38, in assembly. A screw 46 retains the assembly in the handle.

In the modified form of Figures 4, 5 and 6 the construction differs from that of the other figures mainly by the provision of a positive drive, both in the opening and in the closing direction, and a reversible piston and cylinder assembly is provided instead of the piston and spring assembly shown in the other figures.

The modified device includes, therefore, a handle portion 47 which may be enlarged, as at 48, and may have a flange or laterally extending portion 49 adjacent its larger end. It is preferably slotted, as at 50, for convenience in assembly of the parts. Secured in the handle portion 48 by a screw 51 is a jaw supporting member 52. Secured also in the handle portion 48 by a screw 53 is a second jaw-supporting portion 54. This latter portion is provided at one end with a generally rounded or circular enlargement 55 within which a conductor 56 is received and secured. The conductor is provided with an insulating coating 57, and passing through the center of the conductor is positioned a tube 58 through which the pressure fluid for operating the mechanism and for cooling the handle is supplied.

The pressure fluid is conducted through the tube 58 to a valve housing 59. This housing may be provided with a lateral extension 60 which receives a screw 61 by means of which the valve housing is secured to the member 54. The valve includes a valve member 62 which is mounted for rotation in the housing 59 and which has an outwardly extending shaft portion 63 upon which a lever 64 is secured. The lever carries in its outer end a pin 65. The lever extends into a stub slot in an operating member 66. A transverse slot 67 is provided to receive the pin 65 and to permit some lateral movement when the member 66 is reciprocated. The operating member 66 is mounted in a guide 59a and is provided with a spring 68 which normally holds it in the raised position of Figure 5, but which may yield to permit it to be depressed.

The valve housing has an inlet passage 69 with which the tube or conduit 58 is connected. The valve member 62 is mounted in a generally rounded cavity 70. From that cavity a relatively short passage 71 leads to the open air within the general handle assembly. Another passage 72 is connected to a pipe 73 which leads to one end of a cylinder 74. Still another passage 75 is formed within the valve housing 59 and is joined to a tube 76 which leads to the opposite end of the cylinder 74. Thus manipulation of the valve member 62 will direct fluid to either end of the cylinder 74 to move the piston to the right or to the left, and another position of the valve member 62 will cause discharge of air or gas from the valve housing through the passage 71 into the interior of the handle generally.

Movably mounted in the cylinder 74 is a piston 77 fixed to a piston rod 78. The piston rod 78 has fixed on its free end a member 79 in which is mounted a pin 80. Pivoted on opposite ends of the pin are toggles 81 and 82. At its opposite end the toggle 81 is pivotally connected to one arm 83 of a welding rod jaw member 84. The toggle 82 is pivoted at its free end to the arm 85 of a welding rod jaw portion 86. The two jaw members are pivoted, as at 87, on extensions 88 and 89 which are formed, respectively, as parts of the members 52 and 54.

The construction of Figure 7 shows a modification of the valve assembly of Figure 2, and it might be used if the bleeder feature is omitted, or it might be used with the bleeder feature, if desired. Its purpose is to cause a greater discharge of cooling fluid into the handle. In this modification a continuation of the bore within which the upper end of the spring 35 rests is formed with a passage as at 90 and a lateral bore or passage 91 extends from this passage 90 through the portion 36 to its exterior. A second lateral passage 92 is formed in the valve portion 34 and extends from the main bore within which the spring 35 is positioned to the outside of the portion 34. A passage 26 is formed in that portion of the valve housing about the valve portion 36.

The result of the operation of this modification is that in the movement of the valve between the full upper position of Figure 2 and the full lower position, there is a position of partial depression, in which the passage 91 registers with the passage 26 and the passage 92 registers with the passage 32 and a discharge of fluid from the valve housing into the handle occurs at this time as shown in Figure 7. If it is desired to cool the handle without opening the jaws, then the member 38 and associated parts are moved to the position of partial depression as shown in Figure 7. In this position of the valve pressure remains in the cylinder and holds the jaws closed. At the same time fluid passes through the valve housing by means of the passage 26, 91, 90, 92 and 32 and out into the handle to cool it, and this will continue so long as the valve assembly is held in this position of partial depression.

Although I have shown an operative form of my invention, it will be recognized that many changes in the form, shape and arrangement of parts can be made without departing from the spirit of the invention, and my showing is therefore to be taken as, in a sense, diagrammatic. Although the piston 23 may be of metal, it may be of any other suitable material, and for some purposes it is desirable to form the piston of an insulating material. The ball 25 might also be of insulating material. Possible materials from which the piston 24 may be made include neoprene and other synthetic rubber-like materials. The entire piston might be made of such material, or it might be made of a metal jaw or core with a Neoprene coating. In that case the metal core would have no contact with the cylinder 21. The reason for using any insulating material in the piston is, of course, to avoid flow of current through the cylinder and piston assembly, and consequently to avoid arcing between the piston and cylinder. When a non-conductive or insulating material is used, as described, all current must flow through the jaw to the clamped electrode, which is held between the portions 1 and 11.

The use and operation of this invention are as follows:

In general, the device as shown comprises means for accomplishing two important results, one of which is to operate the jaws by power rather than manually. Experience has shown that an operator may in the course of a single day be required to operate the handle to receive and finally to discharge many welding rods, and a very substantial pressure must be exerted by the hand of the operator each time that a rod is engaged or discharged. It is an important advantage therefore to provide power means for accomplishing this result, and the only force which the operator must expend is that necessary to operate the valve which controls the pressure system.

Another advantage follows from the use of this construction. In the past welding handles have generally had springs which are themselves the main force which holds the jaws in rod-engaging position. When a welder handle is new, the spring is generally too strong. As the handle is used, the spring grows weaker and toward the end of the life of the handle the spring is generally too weak to hold the rod adequately.

In this device the jaws are held closed in the engaging position by the power system, and the strength at which the system operates is uniform, depending upon the pressure at which pressure fluid is available, and this of course may be maintained constant in a factory. The spring 20 is merely the member which opens the jaws, and even though it may vary in strength, so long as it is strong enough to move the jaws apart it will operate adquately. One purpose of the invention and one result which it accomplishes is, therefore, to provide power means for holding the welder jaws in rod-engaging position.

A second purpose and the second result which the mechanism accomplishes is that of cooling the welding handle. Experience has shown that welding handles may become so hot as to become very uncomfortable and may even burn the hand of an operator. The cooling fluid, which in this case may be air, passes through the handle. If no bleeder member is used, experience has shown that the mere passage of air to the pressure cylinder and outward through the discharge opening 32 is normally adequate to cool the handle to a point of comfort. However, if greater cooling is necessary, the bleeder connection is used and in that case a certain amount of air is constantly allowed to escape, and this air passing through the handle provides additional cooling.

In operation, therefore, the mechanism is connected to a source of current through the conductor 9, 10 and to a source of pressure fluid through the pipe or conduit 29. The operator has only to depress the valve by means of the portion 38 to permit escape of pressure from the cylinder and piston assembly. In that case the spring 20 opens the jaws, the operator places a welding rod in place between the jaws, then permits the valve to rise under the influence of the spring 35 and pressure fluid is then prevented from escaping through the passage 32. The piston is forced to the position of Figure 2 and the welding rod is positively held between the jaws. This condition remains unchanged until it is necessary to change welding rods, and then the cycle of operations is repeated.

If the bleeder mechanism is not present, the passage of air through the handle is periodical, occurring only when a rod is changed. If the bleeder mechanism is present, of course some air passes constantly through the housing and the handle, and thus cooling is more continuous.

Any pressure means may be used, the piston and cylinder assembly shown being only typical. A flexible bulb or bellows formed of rubber, neoprene or any other synthetic elastic material or formed of metal, properly insulated, might be used instead of the piston and cylinder assembly. If air were not used, a liquid might be used, and in that case means would be provided for liquid circulation, so that upon the actuation of the valve the liquid, instead of being discharged through the opening 32 or some other analogous opening, would be discharged to a return passage. Obviously if a liquid were used, it would be used at such a temperature as to supply an adequate cooling effect.

The cooling effect which occurs either when air is discharged from the piston and cylinder assembly into the handle or when it is discharged through the bleeder connection comprises not merely the cooling due to the mere passage of air but the further cooling or refrigerating effect due to the bleeding or discharge of air from high pressure into the atmosphere.

Where air or gases are used for cooling, they are produced at relatively high pressures and therefore the gaseous medium which flows through the tube 29 is under high pressure and a refrigerating effect takes place either when it is bled through the opening 39 or discharged through the outlet 32 when the piston and cylinder assembly operates.

The modified form of the device shown in Figures 4, 5 and 6 provides a positive means for moving the jaws in both directions. It provides, of course, also the same general cooling effect as that provided by the other form of the device, and it has the added convenience that the conduit for the operating and cooling fluid is contained within the electric conductor.

With the parts in the position shown in Figures 5 and 6, in particular, pressure fluid enters from the pipe 58, passes through the conduit portions 69, 70 and 73 to the left-hand end of the cylinder 74 and moves the piston to the right to the position shown. In this position the jaws 84 and 86 are locked together. Some springiness is present in the members 83 and 85 and it will be noticed that they have been moved slightly to the right of a straight line drawn between the two outer pivot points. The springiness permits this and accomplishes a certain locking effect.

When it is desired to open the jaws, the operating member 66 is depressed and rotates the valve member 62 counter-clockwise from the position shown in Figure 6 to a position in which pressure fluid may pass through the pipe 86, the conduits 69, 70 and 75 and into the pipe 76 and thence to the right-hand end of the cylinder. When this occurs, the pressure fluid is forced into the cylinder from the right and moves the piston to the left, thus opening the jaws to the dotted line position of Figure 5. When this occurs, pressure fluid is expelled from the left-hand end of the cylinder through the pipe 73 and back to the valve housing 59. At that time the valve 62 has been adjusted to a position in which the passage portions 72, 70 and 71 are in communication with each other, and pressure fluid which is expelled from the cylinder may thus be discharged through the outlet passage 70 into the interior of the handle.

When it is desired to close the jaws again, for example after a new welding rod has been put in place, the operating member 66 is allowed to rise again under the influence of the spring 68 and the parts are restored to their original position, and in that position pressure fluid passes through the pipe 73 to the left-hand end of the cylinder and at the same time the passages 75, 70 and 71 are in communication with each other, so that pressure fluid which is expelled from the right-hand end of the cylinder is discharged into the interior of the handle. Thus at each movement of the piston to one end or the other of the cylinder, the jaws are moved either to the open or the closed position, and the pressure fluid which is expelled from the cylinder with each piston movement can be freely discharged into the interior of the handle and accomplish the added cooling effect which is desired.

I claim:

1. In combination in a welder handle, a jaw, a second jaw mounted upon the first jaw, means engaging each jaw and tending, when free to do so, to move the jaws in the opening direction, and power means adapted to act upon the jaws in the closing direction, said means comprising a cylinder and piston assembly, by means of which, when pressure is supplied to the cylinder, the jaws are positively forced toward each other, a housing defining an inlet and an outlet passage, a valve in said housing adapted to control the passage of fluid therethrough, a fluid pressure inlet conduit in communication with said housing, a bleeder discharge from said housing positioned to discharge fluid into said handle to cool it, and a member positioned in said bleeder discharge for adjustment, and adapted to control the bleeder discharge, and an electrical conductor mounted in said handle member and connected to one of said jaws.

2. In combination in a welder handle, a jaw, a second jaw joined to the first jaw, means engaging each jaw and tending, when free to do so, to move the jaws in the opening direction, and power means adapted to act upon the jaws in the closing direction, said means comprising a cylinder and piston assembly, by means of which, when pressure is supplied to the cylinder, the jaws are positively forced toward each other, a housing defining an inlet and an outlet passage, a valve in said housing adapted to control the passage of fluid therethrough, a spring in contact with said valve and biased to hold the same in one position and adapted to yield to permit the valve to be moved to another position, a fluid pressure inlet conduit in communication with said housing, a bleeder discharge from said housing positioned to discharge fluid into said handle to cool it, and a member positioned in said bleeder discharge for adjustment, and adapted to control the bleeder discharge, and an electrical conductor mounted in said handle member and connected to one of said jaws.

3. In combination in a welder handle, a hollow handle member, a jaw fixed thereto, a second jaw mounted for pivotal movement upon the first jaw, spring means engaging each jaw and tending, when free to do so, to move the jaws in the opening direction, and fluid pressure actuated power means mounted within the handle and acting upon the jaws to move them in the closing direction, said means comprising a cylinder and piston assembly, one member being effective upon one jaw and the other being effective upon the other jaw, by means of which, when pressure is supplied to the cylinder, the jaws are positively forced toward each other, a housing defining an inlet and an outlet passage, a valve in said housing adapted to control the passage of fluid therethrough, a spring in contact with said valve and biased to hold the same in one position and adapted to yield to permit the valve to be moved to another position, a fluid pressure inlet conduit in communication with said housing, a bleeder discharge from said housing positioned to discharge fluid into said hollow handle to cool it, and a member positioned in said bleeder discharge for adjustment, and adapted to control the bleeder discharge, and an electrical conductor mounted in said handle member and connected to one of said jaws.

4. In combination in a welder handle, a pair of jaws mounted for relative movement and adapted in one position to engage a welding rod, and in another position to release said rod, and unitary means for cooling said handle and for moving said jaws, said means including a fluid pressure actuated assembly effective upon one portion of each of said jaws, to move the rod-engaging portion of said jaws together when operating fluid under pressure is delivered thereto, said unitary means including means positioned to discharge operating fluid under pressure in cooling relation to said handle, and a spring effective upon the same portions of said jaws, and adapted, when free to do so, to move the rod-engaging portions of said jaws apart.

5. In combination in a welder handle, a pair of jaws mounted for relative movement and adapted in one position to engage a welding rod, and in another position to release said rod, and unitary means for cooling said handle and for moving said jaws, said means including a fluid pressure actuated assembly effective upon one portion of each of said jaws, to move the rod-engaging portion of said jaws together when operating fluid under pressure is delivered to one part of said assembly, and effective upon the same portions of said jaws, to move the rod-engaging portions of said jaws apart, when operating fluid under pressure is delivered to another part of said assembly, valve means for controlling the delivery of fluid to said assembly, said fluid pressure actuated assembly including means positioned to discharge operating fluid under pressure in cooling relation to said handle.

6. In combination in a welder handle, a pair of jaws mounted for relative movement and adapted in one position to engage a welding rod, and in the other position to release said rod, and means for operating said jaws mechanically to engage or to release a rod, said means comprising a fluid pressure actuated assembly mounted on said handle and effective to move the rod-engaging portion of said jaws together, and effective also to move the rod-engaging portions of said jaws apart, said fluid pressure actuated assembly including a cylinder and a double acting piston, and means for delivering operating fluid to opposite ends of said cylinder for actuating said piston comprising a fluid conduit, a housing having fluid passages, a valve positioned to control the flow of fluid through said passages, to opposite ends of said cylinder and to discharge exhaust fluid therefrom for desired actuation of said jaws, and means to direct the fluid so discharged into cooling relation with the handle, and an electrical conductor connected electrically to one of said jaws.

7. In combination in a welder handle, jaws mounted for relative movement and adapted in one position to engage a welding rod, and in another position to release said rod, and unitary means for cooling said handle and for moving said jaws, said means comprising a fluid pressure actuated assembly effective upon said jaws, to move the rod-engaging portion of said jaws together when operating fluid under pressure is delivered to said fluid pressure actuated assembly, and a spring upon said jaws, and adapted, when free to do so, to move the rod-engaging portions of said jaws apart, and means for actuating said power means comprising a fluid conduit, a housing having fluid passages, a valve positioned to control the flow of fluid through said passages to and from said fluid pressure actuated assembly, means effective upon said valve to hold it in the inlet position and adapted to yield to permit the valve to be moved to the outlet position, means under the control of said valve and positioned to discharge fluid under pressure in cooling relation to said handle and an electrical conductor connected electrically to one of said jaws.

8. In combination in a welder handle, a pair of jaws mounted for relative movement and adapted in one position to engage a welding rod, and in another position to release said rod, and fluid pressure actuated means for operating said jaws mechanically and for cooling said handle, said means comprising a fluid pressure actuated assembly effective upon one portion of each of said jaws, and adapted to move the rod-engaging portion of said jaws together, and a spring effective upon the same portions of said jaws, and adapted, when free to do so, to move the rod-engaging portions of said jaws apart, and means for delivering operating fluid to said fluid pressure actuated assembly for actuating said jaws comprising a fluid conduit, a housing having fluid passages, a valve positioned to control the flow of fluid through said passages to said fluid pressure actuated assembly and to discharge exhaust fluid therefrom, a spring effective upon said valve and biased to hold it in the inlet position and adapted to yield to permit the valve to be moved to the outlet position, and normally closed fluid discharge means under control of said valve and operating, when said valve is in an intermediate position, to discharge fluid under pressure in cooling relation to said handle while maintaining full operating pressure on said fluid pressure actuated assembly and an electrical conductor connected electrically to one of said jaws.

9. In combination in a welder handle, a hollow handle member, a pair of weld-rod clamping members, pivot means connecting said clamping members intermediate their ends and providing rod clamping portions and operating portions on opposite sides of the pivot, means mounting said clamping members on said handle member with said pivot in advance of the forward end of the handle and the operating portions of the clamping members extending rearwardly from said pivot, a fluid pressure actuated power unit mounted within the hollow handle for actuating the clamping members, operating connections between said power unit and the operating portions of the clamping members, conduit means within the handle for delivering operating fluid to said unit, valve means within the handle for controlling the flow of fluid to and from said unit, and an electrical conductor connected to one of said clamping members.

10. In combination in a welder handle, a hollow handle member, a pair of weld-rod clamping members, pivot means connecting said clamping members intermediate their ends and providing rod clamping portions and operating portions on opposite sides of the pivot, means mounting said clamping members on said handle member with said pivot in advance of the forward end of the handle and the operating portions of the clamping members extending rearwardly from said pivot and terminating within the hollow handle member, a fluid pressure actuated power unit mounted within the hollow handle for actuating the clamping members, said unit including cylinder and piston members, motion transmission means operatively connecting the piston and cylinder with the operating portions of said clamping members, conduit means within the handle for delivering operating fluid to said unit, valve means within the handle for controlling the flow of fluid to and from said cylinder, and an electrical conductor connected to one of said clamping members.

11. In combination in a welder handle, a hollow handle member, a pair of weld-rod clamping members, pivot means connecting said clamping members intermediate their ends and providing rod clamping portions and operating portions on opposite sides of the pivot, means mounting said clamping members on said handle member with said pivot in advance of the forward end of the handle and the operating portions of the clamping members extending rearwardly from said pivot, a fluid pressure actuated power unit mounted within the hollow handle for actuating the clamping members, said unit including cylinder and piston members disposed to provide piston movement generally longitudinally of the handle, a pair of toggle links pivotally interconnecting the operating portions of the clamping members, a piston rod operatively connecting the piston and toggle links whereby to pivotally actuate the clamping members when the piston reciprocates, conduit means within the handle for delivering operating fluid to said unit, valve means within the handle for controlling the flow of fluid to and from opposite ends of said cylinder, and an electrical conductor connected to one of said clamping members.

12. In combination in a welder handle, a pair of jaw members mounted for relative movement and effective in one position to engage and clamp a weld-rod and in another position to release said weld-rod, fluid pressure actuated power means for actuating said jaw members together with means operatively connecting said power means and said jaw members, means for delivering fluid under pressure to said power means and fluid discharge means positioned to direct fluid under pressure in cooling relation to said handle, and an electrical conductor connected to one of said jaw members.

WILLIAM C. ANTHONY.